United States Patent
Plummer

(10) Patent No.: US 7,043,931 B2
(45) Date of Patent: May 16, 2006

(54) METHOD AND APPARATUS FOR COOLING INTERIOR SPACES OF VEHICLES

(75) Inventor: Lew E Plummer, Mount Vernon, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 10/900,237

(22) Filed: Jul. 27, 2004

(65) Prior Publication Data

US 2006/0021366 A1 Feb. 2, 2006

(51) Int. Cl.
*F25B 27/00* (2006.01)

(52) U.S. Cl. .............................. 62/236; 62/59; 62/244

(58) Field of Classification Search .................... 62/59, 62/236, 244, 430–439
See application file for complete search history.

(56) References Cited

U.S. PATENT DOCUMENTS

| | | | |
|---|---|---|---|
| 2,160,389 A * | 5/1939 | Palmer | 62/59 |
| 2,185,515 A * | 1/1940 | Neeson | 62/133 |
| 2,193,838 A * | 3/1940 | Murphy et al. | 62/133 |
| 2,875,595 A | 3/1959 | Kleist | |
| 3,621,930 A | 11/1971 | Dutchak | |
| 3,976,458 A | 8/1976 | Krug | |
| 4,015,962 A * | 4/1977 | Tompkins | 62/175 |
| 4,051,691 A * | 10/1977 | Dawkins | 62/236 |
| 4,141,425 A | 2/1979 | Treat | |
| 4,209,993 A | 7/1980 | Rannenberg | |
| 4,237,384 A | 12/1980 | Kennon | |
| 4,350,900 A | 9/1982 | Baughman | |
| 4,537,047 A | 8/1985 | Seshadri et al. | |
| RE32,100 E | 4/1986 | Rannenberg | |
| 4,632,205 A | 12/1986 | Lewis | |
| 4,637,222 A * | 1/1987 | Fujiwara et al. | 62/244 |
| 4,720,980 A | 1/1988 | Howland | |
| 4,762,170 A | 8/1988 | Nijjar et al. | |
| 4,935,639 A | 6/1990 | Yeh | |
| 4,957,657 A | 9/1990 | Stil et al. | |
| 5,056,330 A | 10/1991 | Isobe et al. | |
| 5,287,004 A | 2/1994 | Finley | |
| 5,553,662 A | 9/1996 | Longardner et al. | |
| 5,920,127 A | 7/1999 | Damron et al. | |
| 6,094,926 A * | 8/2000 | Nakayama et al. | 62/236 |
| 6,365,985 B1 | 4/2002 | Cohen | |
| 6,467,293 B1 | 10/2002 | Goosman | |
| 2001/0011825 A1 | 8/2001 | de Vega | |
| 2003/0192952 A1 | 10/2003 | Horn et al. | |
| 2004/0060312 A1 | 4/2004 | Horn et al. | |
| 2004/0123976 A1 | 7/2004 | Horn et al. | |

(Continued)

OTHER PUBLICATIONS

"Our Products: high energy efficiency," *Product Sheet*, Groupe Énerstat Inc., n.d., <http://www.groupeenerstat.com/en/products> [retrieved Oct. 18, 2005].

(Continued)

*Primary Examiner*—William E. Tapolcai
(74) *Attorney, Agent, or Firm*—Christensen O'Connor Johnson Kindness PLLC

(57) ABSTRACT

A vehicle interior cooling system (100) for a vehicle having a cabin (108) and an engine (107) for providing propulsion power is disclosed. The vehicle interior cooling system includes a cabin cooling system (102) driven by the engine of the vehicle and an electrically driven cooling system (103) having a cold storage device (110) coupled to the vehicle. The electrically driven cooling system selectively thermally charges the cold storage device when the engine is in an on and/or off position.

22 Claims, 2 Drawing Sheets

U.S. PATENT DOCUMENTS

2005/0087333 A1    4/2005    Horn et al.

OTHER PUBLICATIONS

Atkinson, W. "SAE Phoenix Alternate Refrigerant Symposium Summary," *Proceedings of the SAE Phoenix Alternate Refrigerant Symposium*, Jun. 28-Jul. 1, 2004, Scottsdale, Ariz., pp. 1-23, <http://66.102.7.104/search?q=cache:STv9pFdOWW8J:www.sae.org/events/aars/summary.pdf+%22group . . . > [retrieved Mar. 24, 2005].

"Demonstration Progress Reports—Round 3," *Transport Canada*, May 28, 2004, <http://www.tc.gc.ca/programs/Environment/Freight/FETI/FSDP/Reports/Round_3/menu.htm> [retrieved Mar. 22, 2005].

"Development of an Advanced Thermal Management System for an Electric Vehicle—Phase 2," (Report No. 13902F), *Transport Canada*, 2002, <http://www.tc.gc.ca/includes/aspscripts/printable.asp?lang=en> [retrieved Mar. 24, 2005].

"Our Products: Novacab," Groupe Énerstat Inc., Groupe Enerstat.com, n.d., <http://www.groupeenerstat.com/en/products/> [retrieved Mar. 22, 2005].

Novacab, Groupe Énerstat Inc., Novacab.com, n.d., <http://www.novacab.com/> [retrieved Mar. 22, 2005].

"Projet REHP²: Développment et Implantation d'un Système de Gestion Thermique Pour Véhicule Électrique (TP13902F)," *Transport Canada*, Aug. 11, 2003, <http://www.tc.gc.ca./tdc/summary/13900/13902f.htm> [retrieved Mar. 24, 2005].

Un Systéme Révolutionnaire de Contrôle Climatique, Groupe Énerstat Inc, dated May 14, 2003. An English translation is attached herewith.

Atkinson, W., "SAE Phoenix Alternate Refrigerant Symposium Summary," *Proceedings of the SAE Phoenix Alternate Refrigerant Symposium*, Jun. 28-Jul. 1, 2004, Scottsdale, AZ. pp. 1-23, <http://66.102.7104/search?q=cache:STv9pFdOWW8J:www.sae.org/events/aars/summary.pdf+%22group...> [retrieved Mar. 24, 2005].

"Demonstration Progress Reports—Round 3, " Transport Canada, May 28, 2004, <http://www.tc.gc.ca/programs/Environment/Freight/FETI/FSDP/Reports/Round—3/menu.htm> [retrieve Mar. 22, 2005].

"Development of an Advanced Thermal Management System for an Electric Vehicle —Phase 2, " (Report No. 13902F), *Transport Canada* , 2002, ' http://www.tc.gc.ca./includes/aspscripts/printable.asp?lange =en >[retrieve Mar. 24, 2005].

"Our Products: Novacab, " Group Énerstat Inc., *GroupEnerstatcom* , n.d.,[http://www.groupeenerstat.com/en/products/] <retrieved Mar. 22, 2005>.

Novacab, Groupe Énerstat Inc., *Novacab.com* , n.d., [http://www.novacab.com/] <retrieved Mar. 22. 2005>.

"Projet REHP² : Développement et Implantation d'un Système de Gestion Thermique Pour Véhicule Électrique (TP13902F), " *Transport Canada* , Aug. 11, 2003, [http://www.tc.gc.ca/tdc/summary/13900/13902f.htm ]<retrieved Mar. 24, 2005 >.

* cited by examiner

METHOD AND APPARATUS FOR COOLING INTERIOR SPACES OF VEHICLES

FIELD OF THE INVENTION

The present invention relates generally to vehicle interior cooling systems, and more particularly to vehicle interior cooling systems utilizing a cold storage device.

BACKGROUND OF THE INVENTION

Keeping the interior of a vehicle at a comfortable temperature is important in providing driver comfort. It is desirable to maintain the interior at a comfortable temperature while the vehicle is parked. This is most notably the case for long haul truckers who sleep in the cab of the truck for the required 10-hour rest period. One way of keeping the cab of the truck cool is to maintain the engine at an idle so that the truck's regular air conditioning system can be run to cool the cab; however, this results in increased fuel consumption, pollution, engine maintenance, and most often reduces battery life. Further, exasperating the problem is that the truck's engine must be run at a higher RPM than idle to produce enough current to support sleeper loads, especially if the air conditioning system is run. If the RPM of the engine is not increased above idle, the batteries will operate in deficit.

One option is to shutdown the engine. In fact, environmental considerations have lead to federal regulations that will soon require maintaining interior cab temperatures of a Class 8 vehicle in an engine off or no-idle condition.

Thus, there exists a need for a cooling system that can keep the cab cool not only when the engine of the truck is running but also when the truck is parked and the engine is shutdown.

Referring to FIG. 1, one previously developed solution for fulfilling this need is shown. The illustrated prior art cooling system 10 includes a cold storage device 12. The cold storage device 12 is essentially a cold sink and is well known to those skilled in the art, and therefore will not be described in detail herein for the sake of brevity. While the truck engine is running, the air conditioning system 14 cools a cab 16 of the truck and turns a phase change material held within the cold storage device 12 from a liquid to a solid, i.e. freezes the phase change material. During hot days however, the conditioning system 14 does not have sufficient capacity to adequately both cool the cab 16 of the truck and cold charge the cold storage device 12, leaving the driver in a dilemma, i.e. to be comfortable while driving but not charge the cold storage device 12, making for an uncomfortable sleep, or forego cooling the cab, endure the high heat while driving, and charge the cold storage device 12 to make sleep more comfortable.

The air conditioning system 14 of FIG. 1 includes a compressor 18, a condenser 20, a receiver 22, a three-way valve 24, two expansion valves 26 and 28, and two evaporators 30 and 32. During operation, the compressor 18 compresses a refrigerant, producing a hot pressurized gas which is converted into a cool, high pressure liquid by the condenser 20. This is accomplished by passing cool ambient air by fan or other means over the condenser 20 to remove heat from the refrigerant.

The receiver 22 accumulates the liquid refrigerant produced in the condenser. The three-way valve 24 selectively directs the refrigerant to either pass through the first or the second evaporator 30 or 32 (or a selected combination thereof) via the appropriate expansion valves 26 and/or 28.

The expansion valves 26 and 28 transform the high pressure liquid refrigerant to a low temperature, low pressure gas and/or liquid mixture refrigerant.

The first evaporator 30 is located in heat exchange communication with the cab 16. A fan 34 is used to pass air over the first evaporator 30, which cools the air, which is then directed into the cab to cool the same. The second evaporator 32 is located in the cold storage device 12 and is used to cool the phase change material present therein, preferably converting the phase change material to a solid.

When the truck engine is shutdown, the engine driven compressor 18 cannot be run as it is driven by the engine. Further, even if one were to attempt to drive the compressor by using an electric motor utilizing power obtained from the truck's batteries, the current draw required to drive a compressor of the size required to draw down the entire cab would drain the batteries in such a short period that such an arrangement is unfeasible. For instance, a typical compressor of the size required to draw down the entire cab typically requires approximately 8 horsepower to run at full capacity, which, on a 12-volt system, would draw 200 amps. Such a large draw would drain a truck battery in a very short period.

Thus, in previously developed cooling systems, if cab cooling is desired with the engine shutdown, a heat transfer system 35 is used. The heat transfer system 35 uses an electric pump 36. The electric pump 36 pumps antifreeze infused water through heat exchange coils 38 embedded in the cold storage device 12, thereby reducing the temperature of the antifreeze infused water and partially melting the phase change material contained in the cold storage device 12. The cooled antifreeze infused water then passes through a heat exchanger 40. An electric fan 42 blows air over the coils of the heat exchanger 40, thereby blowing cold air into the cab 16 to cool the cab 16.

Although effective, this previously developed cooling system 10 is not without its problems. First, the standard truck air conditioning system 14 is required to produce 38–42° F. air at a cabin diffuser while the thermal storage unit is required to support temperatures in the 26° F. range. Therefore, the truck air conditioning system must cycle off for a short time while the storage system switches the compressor to a higher pressure mode to produce 26° F. temperatures for use in the thermal storage unit. Typically, when the ambient temperatures are in excess of 100° F., the standard engine air conditioning system is not adequate and often becomes overloaded attempting to cool the cab 16 and convert the phase change material of the cold storage device 12 to a solid. Further, with the engine shutdown, the cold storage device 12 cannot be recharged; thus the ability to cool the cab 16 is limited to the cooling capacity of the cold storage device 12 at time of engine shut-down. Thus, there exists a need for a vehicle cooling system that reduces the load on the truck's regular air conditioning system so it does not become overloaded attempting to cool both the cab of the truck and the cold storage device. Further, there exists a need for a vehicle cooling system that is operable to recharge the cold storage device even when the engine of the vehicle is shutdown and plugged into shore power, i.e. plugged into an alternating current power source provided to mobile users at places such as truck stops, parking lots, warehouses, loading docks, driver's home, etc.

SUMMARY OF THE INVENTION

One embodiment of a vehicle interior cooling system formed in accordance with the present invention for a vehicle having a cabin and an engine for providing propulsion power is disclosed. The vehicle interior cooling system includes a cabin cooling system driven by the engine of the vehicle and an electrically driven cooling system having a cold storage device coupled to the vehicle. The electrically driven cooling system selectively thermally charges the cold storage device when the engine is in an on position.

Another embodiment of a vehicle interior cooling system formed in accordance with the present invention for a vehicle having a cabin and an engine for providing propulsion power is disclosed. The vehicle interior cooling system includes a first cooling system disposed within the vehicle and driven by the engine. The vehicle interior cooling system further includes a second cooling system having a cold storage device coupled to the vehicle. The second cooling system is selectable to thermally charge the cold storage device when the engine is in an off position.

An alternate embodiment of a vehicle mounted cooling system for cooling an interior space of a vehicle, the vehicle having an engine for providing propulsion power to the vehicle, is disclosed. The vehicle mounted cooling system includes a cabin cooling system powered by the engine for cooling the interior space of the vehicle. The vehicle mounted cooling system also includes a cold storage system operable independently of the standard cabin cooling system normally found on a truck. The cold storage system has a cold storage device thermally chargeable and dischargeable by the cold storage system for cooling the interior space of the vehicle.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 2:
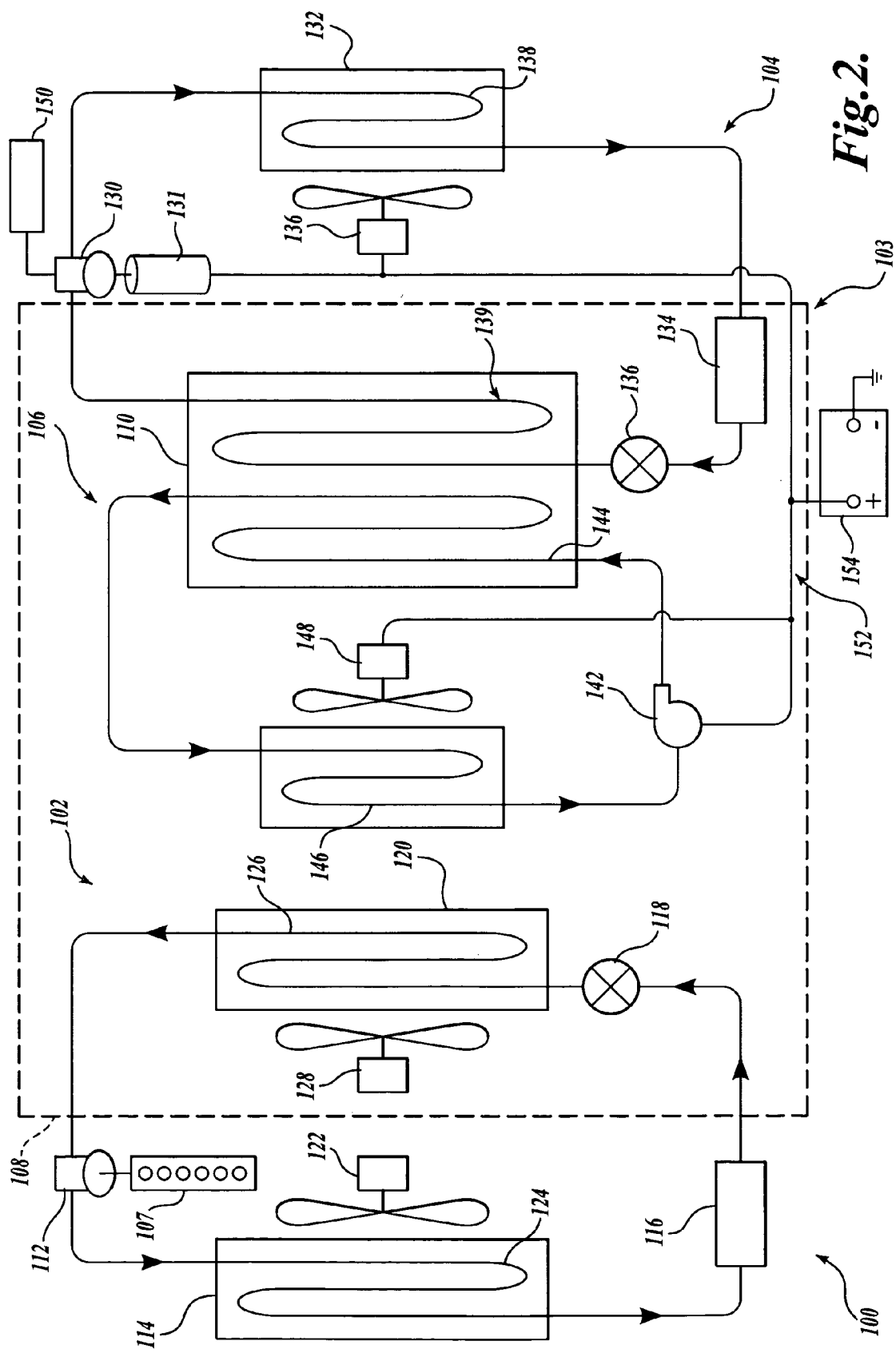
FIG. 2 is a piping schematic of one embodiment of a vehicle cooling system formed in accordance with the present invention having a regular vehicle cooling system, a cold storage device, a heat transfer system, and a cold storage charging system.

FIG. 2 illustrates a vehicle cooling system 100 formed in accordance with one embodiment of the present invention. Although the embodiments of the present invention will be described as implemented with regard to a cab of a Class 8 truck, one skilled in the relevant art will appreciate that the disclosed vehicle cooling system 100 is illustrative in nature and should not be construed as limited to application for cooling a cab of a Class 8 truck. It should therefore be apparent that the vehicle cooling system 100 has wide application, and may be used in any situation wherein cooling any space of any structure is desirable both when a drive source for a space's regular air conditioning system is running and when the drive source is shutdown.

For purposes of this detailed description, the vehicle cooling system 100 may be divided into two main subassemblies: a main cooling system 102 and a cold storage system 103. Both subassemblies are adapted to cool a cab 108 of the truck. Generally stated, the main cooling system 102 is the air conditioning system and is used to cool the cab 108 of the truck (not shown) while an engine 107 of the truck is running.

Generally, the cold storage system 103 is used to cool the cab 108 of the truck while the engine 107 of the truck is shutdown, however it may also be used to cool the cab 108 while the engine 107 is running. The cold storage system 103 includes a cold storage charging system 104, a heat transfer system 106, and a cold storage device 110. The cold storage charging system 104 is used to cold charge the cold storage device 110 while the engine 107 is running, and may also be used to recharge the cold storage device 110 while the engine 107 is shutdown (with or without shore power being provided).

The heat transfer system 106 is used to transfer low thermal energy stored in the cold storage device 110 to the cab 108 of the truck while the engine 107 is shutdown. Thus, the cold storage charging system 104 of the present invention provides a cooling system separate from the main cooling system 102 for cold charging the cold storage device 110. This aids in preventing the main cooling system 102 from becoming overloaded, while also permitting the cold storage device 110 to be recharged while the engine 107 is shutdown.

The main cooling system 102 contains well known components arranged in accordance with standard practices in the art of cooling system design and manufacture. These components include a compressor 112, a condenser 114, a receiver 116, an expansion valve 118, and an evaporator 120.

The compressor 112 is driven by the engine 107 of the truck by any number of suitable methods, such as by a belt and pulley system. In operation, the compressor 112 compresses a refrigerant, producing a hot, high pressure refrigerant at the outlet of the compressor 112. The refrigerant then moves through the condenser 114, wherein relatively cold air, typically ambient air, is driven, such as by a fan 122, over a set of heat exchange coils 124 of the condenser 114. As the cool air passes over the coils 124, heat is removed from the refrigerant, causing the refrigerant to condense into a liquid, where it is accumulated in the receiver 116.

The expansion valve 118 flashes the liquid refrigerant into a low pressure, low temperature gas and/or liquid mixture. The low pressure, low temperature refrigerant is passed through the evaporator 120 via a set of heat exchange coils 126 disposed in heat exchange communication with the interior air of the cab 108. A fan 128 directs air to pass over the heat exchange coils 126, thereby causing heat to be transferred from the air to the refrigerant, thereby cooling the air and heating the refrigerant, converting the refrigerant into a low pressure, hot gas. The cooled air is directed into the cab 108 of the vehicle thereby cooling the cab 108. The refrigerant, as a low pressure, hot gas, is directed to the inlet of the compressor 112 and the cycle is started anew.

Although a particular main cooling system 102 is depicted and described, it should be apparent to those skilled in the art that many other cooling system designs and types are suitable for use with and are within the spirit and scope of the present invention, the described main cooling system being only illustrative in nature.

Still referring to FIG. 2, the cold storage charging system 104 includes an electrically driven compressor 130, a condenser 132, a receiver 134, an expansion valve 136, and a set of evaporator coils 139. The electrically driven compressor 130 is preferably connected to the vehicle's electrical system 152 and driven by an electric motor 131. In one embodiment, the compressor 130 is driven by electricity provided by an engine driven alternator (not shown) while the engine 107 is running and from the batteries 154 (or shore power) when the engine 107 is shutdown.

In operation, the compressor 130 compresses a gaseous refrigerant, forming a hot, high pressure refrigerant at the outlet of the compressor 130. The refrigerant is moved through the condenser 132, wherein relatively cold air, typically ambient air, is driven, such as by a fan 136, over a set of heat exchange coils 138 of the condenser 132. As the cool air passes over the coils 138, heat is removed from the refrigerant, causing the refrigerant to condense into a liquid, where it is accumulated in the receiver 134.

An expansion valve 136 flashes the liquid refrigerant into a low pressure, low temperature gas and/or liquid mixture. The low pressure, low temperature refrigerant is passed through the set of evaporator coils 139 set within a cold storage device 110. As the gas is passed through the evaporator coils 139, heat is transferred from a phase change material present in the cold storage device 110 into the low pressure, low temperature refrigerant, thereby cooling the phase change material and converting the refrigerant into a superheated gas. The low pressure, superheated gas is compressed by the compressor 130 as the cycle begins anew.

The heat transfer system 106 includes an electrically driven pump 142, a first set of heat exchange coils 144 located in the cold storage device 110, and a second set of heat exchange coils 146 disposed in heat exchange communication with the interior air of the cab 108.

In operation, the electrically driven pump 142 drives a heat transfer fluid, such as antifreeze infused water, through the first set of heat exchange coils 144 disposed in the cold storage device 110. As the heat transfer fluid passes through the coils 144, heat is transferred from the heat transfer fluid to the phase change material present in the cold storage device 110, thereby cooling the heat transfer fluid and heating the phase change material. The cooled heat transfer fluid is then passed through the second set of heat exchange coils 146. A fan 148 drives air over the second set of heat exchange coils 146 and into the cab 108 thereby cooling the cab 108. Preferably, the cool air exiting the heat exchange coils 146 is directed toward the headboard end of a driver bunk and air to be cooled is drawn from the foot of the driver bunk. As the air passes over the coils 146, heat is transferred from the air into the heat transfer fluid, thereby heating the heat transfer fluid and cooling the air. The heat transfer system 106 continues in a cyclic pattern, thereby transferring the low thermal energy stored in the cold storage device 110 to the interior air of the cab 108.

In light of the above description of the components and individual operation of the main cooling system 102, the cold storage charging system 104, and the heat transfer system 106, the operation of these system relative to one another will now be described.

Operation of the vehicle cooling system 100 may be divided into two distinct modes: a first mode when the engine 107 of the truck is running, and a second mode when the engine 107 of the truck is shutdown. When the engine 107 is running, the main cooling system 102 is selectively run to maintain the interior air of the cab at a predetermined comfortable temperature or within a selected range of temperatures. The cold storage charging system 104 is run while the engine is running and is powered by electricity generated by the engine's 107 alternator (not shown) to cold charge the phase change material present in the cold storage device 110 via an electrically driven compressor, preferably converting the phase change material from a liquid to a solid. Inasmuch as the cooling load of the cold storage device 110 is borne by a separate system, i.e. the cold storage charging system 104, the cooling load of the main cooling system 102 is reduced as it is only required to cool the cab 108, and not the cab 108 and the cold storage device 110. Thus, because the cooling load of the main cooling system 102 has been reduced, less expensive, lighter, and lower capacity components may be used in the main cooling system 102.

Further, inasmuch as the cooling load of the cold storage device 110 is borne by a separate system, there is no lag time when initiating cold charging of the cold storage device 110 as was the case with previously developed vehicle cooling systems. More specifically, in previously developed cooling systems, a single compressor was used to provide both low temperature coolant (such as 26° Fahrenheit) to cold charge the cold storage device and higher temperature coolant (such as 42° F.) to provide cabin cooling. To provide both a low and high temperature coolant, the compressor of the main cooling system was reconfigured between a high pressure mode and a low pressure mode to provide a reduced temperature coolant for cold charging the cold storage device 110 and an elevated temperature coolant for cabin cooling. As the system was reconfigured, a lag time existed as the system was toggled between high and low pressure modes of operation.

Of note, when the engine 107 is running at an idle, the engine 107, or more specifically an alternator (not shown) coupled to the engine 107, may not produce enough electricity to power the cold storage charging system 104 necessitating the drawing of current from the batteries of the vehicle. Thus, in one embodiment of the present invention, a control system 150 is used which automatically shuts down the electrical compressor 130 of the cold storage charging system 104 to impede the batteries of the vehicle from being overly depleted when a select condition is present, such as the RPM of the vehicle falling below a predetermined RPM (for instance when the engine is idling), or when the voltage of the batteries of the vehicle fall below a predetermined voltage, such as 12.5 volts.

The heat transfer system 106 is normally not run while the engine 107 is running, since the main cooling system 102 preferably provides sufficient cooling capacity to handle the cooling load of the cab 108. However, the heat transfer system 106, and preferably the cold storage charging system 104, may be run simultaneously with the main cooling system 102 in some instances. For example, running the heat transfer system 102 and the cold storage charging system 104 simultaneously with the main cooling system 102 is especially beneficial in handling peak loads such as during the initial drawing down of the cab temperature. In this mode of operation, the heat transfer system 106 supplements the main cooling system 102 to provide increased capacity during peak loads. Preferably, in this mode, the heat transfer system 106 would be run at a reduced capacity such that the cold storage charging system 104 would still be able to cold charge the cold storage device 110. In other words, the heat transfer system 106 would be run at a reduced capacity such that more heat would be removed from the cold storage device 110 than transferred into the cold storage device 110 such that the phase change material in the cold storage device 110 will still be able to undergo phase change to a solid in a reasonable amount of time.

The operation of the vehicle cooling system 100 when the engine 107 is shutdown, such as when a driver is sleeping in the cab 108, will now be described. Because the engine 107 is shutdown, the engine driven compressor 112 of the main cooling system 102 cannot be run, and therefore the main cooling system 102 is shutdown and non-operational. As discussed above in the Background Section of this detailed discussion, even if one were to attempt to drive the compressor from a separate electrically driven drive motor, the current required to run the compressor of the main cooling system 102, which is sized sufficiently large to handle a maximum cooling load of the cab, would drain the truck's batteries 154 in short order, making such a configuration impractical. For instance, as discussed above, a typical compressor of the size required to draw down the entire cab typically requires approximately 7 horsepower to run at full capacity, which, on a 12-volt system, would draw 435 amps. Such a large draw would drain a truck battery in a very short period.

Thus, cooling of the cab 108 is provided by the cold storage system 103 during engine 107 shutdown. Moreover, the heat transfer system 106 is energized and run off of electricity obtained from the truck's electrical system 152. In one working embodiment, operation of the components of the heat transfer system 106 draws a light load, such as approximately 4 to 5 amps, thus the heat transfer system 106 may be continuously operated over extended periods without significantly draining the truck's batteries 154 during the required driver rest period.

Operation of the heat transfer system 106 results in the low thermal energy stored in the cold storage device 110 to be transferred to the interior air of the cab 108 as described above while drawing only a small amount of electricity from the truck's storage batteries 154. The cold storage charging system 104 normally is not run when the engine 107 is shutdown. However, the compressor 130 and fan 136, since they are electrically driven, may be run for a limited period to recharge the cold storage device 110 while the engine 107 is shutdown, using electrical energy stored in the truck's electrical system 152, such as energy stored in the batteries 154 of the truck's electrical system 152.

In one working embodiment, operation of the components of the heat transfer system 106 in combination with the cold storage charging system 104 draws a mid-sized load, such as approximately 25 to 30 amps. Thus, from comparisons of the amperage draws, it should be apparent to those skilled in the art that the compressor 130 of the cold charging system 104 is sized at least half of the capacity of the compressor 112 of the main cooling system 102, and preferably at about one quarter or less of the capacity of the main cooling system 102 compressor 112. In one working embodiment, the capacity of the compressor 130 of the cold charging system 104 is sized at ½ of the capacity of the compressor 112 of the main cooling system 102 since the main cooling system is required to pull the cabin down while the cold charging system is used just to maintain the temperature in an already cooled cabin. Thus, the heat transfer system 106 and/or the cold storage charging system 104 may be simultaneously run for short periods without completely draining the truck's batteries 154. By running the cold storage charging system 104 while the engine 107 is shutdown, the max cooling capacity of the cold storage device 110 may be in effect expanded.

In a further mode of operation, with the engine 107 shutdown and the vehicle coupled to shore power, an inverter/charger (not shown) may be used to charge the vehicle batteries, drive the electrically driven compressor 130 to charge the cold storage device 110, and/or run the heat transfer system 106 to cool the cab 108 of the truck. Thus, the illustrated vehicle cooling system 100 permits the cooling of the cab 108 and/or the thermal charging of the cold storage device 110 while the engine 107 shutdown, a departure from previously developed vehicle cooling systems, which require the engine to be run during cooling of the cab and thermal charging of the cold storage device.

Figure 1:
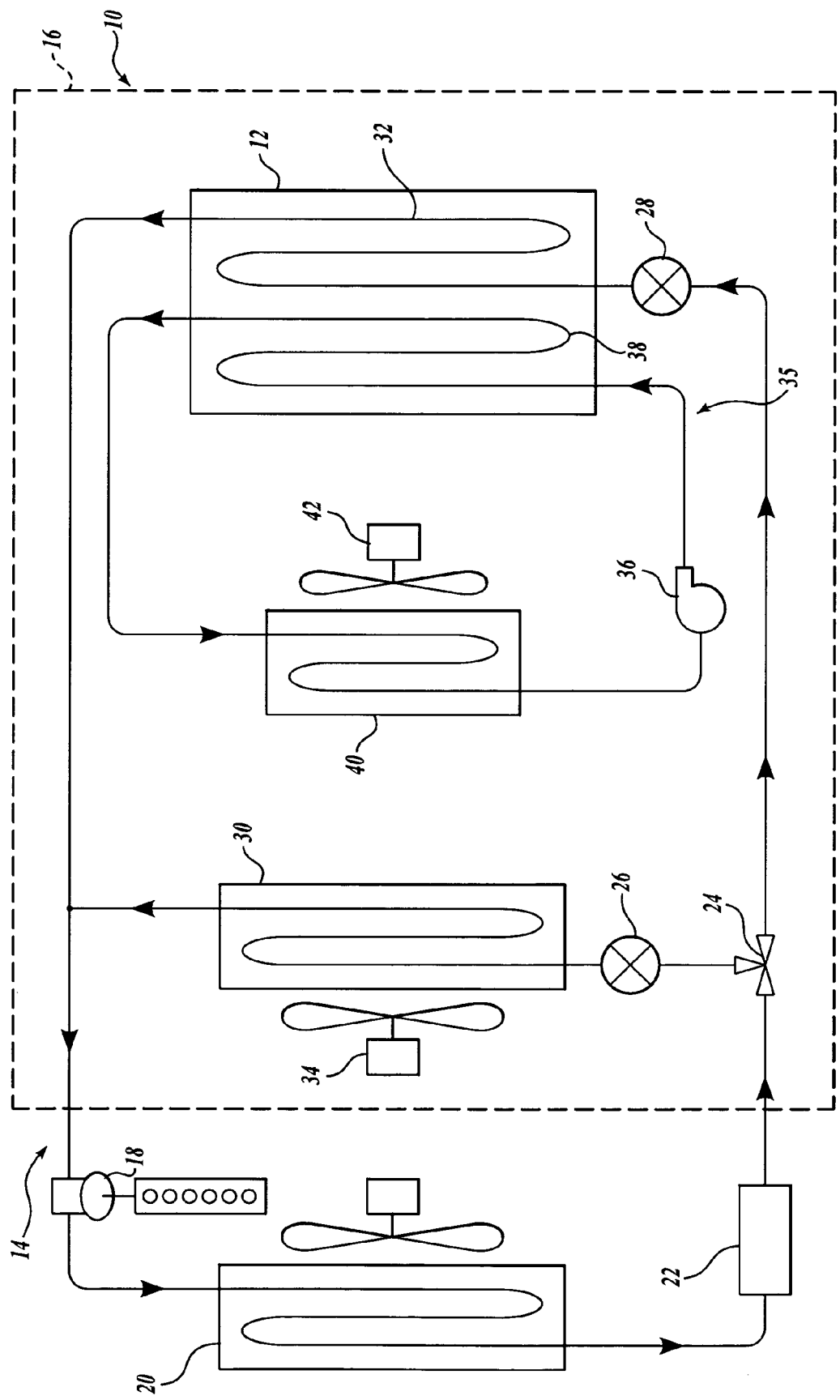
FIG. 1 is a piping schematic of a previously developed vehicle cooling system having a regular vehicle cooling system, a cold storage device, and a heat transfer system.

Although the above described and illustrated embodiment shows the main cooling system 102 disassociated from the cold storage device 110, it should be apparent to those skilled in the art that other configurations are within and suitable for use with the present invention. For instance, the main cooling system 102 may be coupled in heat exchange communication with the cold storage device 110 as shown in FIG. 1. In this configuration, the main cooling system 102 may be operated to aid in cold charging the cold storage device 110 while the truck engine 107 is running, thereby decreasing the amount of time required to fully charge the cold storage device 110.

While the preferred embodiment of the invention has been illustrated and described, it will be appreciated that various changes can be made therein without departing from the spirit and scope of the invention.

The invention claimed is:

1. A vehicle interior cooling system for a vehicle having a cabin and an engine for providing propulsion power, the vehicle interior cooling system comprising:
    (a) a cabin cooling system driven by the engine of the vehicle; and
    (b) an electrically driven cooling system having a cold storage device coupled to the vehicle, the electrically driven cooling system selectively thermally charging the cold storage device when the engine is in an on position and being selectable to thermally cool the cabin when the engine is in an off position and selectable to thermally cool the cabin when the engine is in the on position.

2. The vehicle interior cooling system of claim 1, wherein the electrically driven cooling system is selectable to cool the cabin simultaneously with the cabin cooling system.

3. The vehicle interior cooling system of claim 1, wherein the electrically driven cooling system is a water conditioning cooling system.

4. The vehicle interior cooling system of claim 1, wherein the electrically driven cooling system selectively thermally charges the cold storage device when the engine of the vehicle is in an off position.

5. The vehicle interior cooling system of claim 1, wherein the electrically driven cooling system is thermally independent of the cabin cooling system.

6. The vehicle interior cooling system of claim 1, wherein the electrically driven cooling system selectively cools the cabin and simultaneously thermally charges the cold storage device while the engine is in the off position.

7. The interior cooling system of claim 1, wherein the cabin cooling system includes an engine driven first compressor for compressing a first refrigerant for cooling the cabin and wherein the electrically driven cooling system includes an electrically powered second compressor for compressing a second refrigerant for thermally charging the cold storage device.

8. A vehicle interior cooling system for a vehicle having a cabin and an engine for providing propulsion power, the vehicle interior cooling system comprising:
    (a) a cabin cooling system driven by the engine of the vehicle; and
    (b) an electrically driven cooling system having a cold storage device coupled to the vehicle, the electrically driven cooling system selectively thermally charging the cold storage device when the engine is in an on position and simultaneously selectively cools the cabin to supplement the cabin cooling system.

9. A vehicle interior cooling system for a vehicle having a cabin and an engine for providing propulsion power, the vehicle interior cooling system comprising:
(a) a first cooling system disposed within the vehicle and driven by the engine; and
(b) a second cooling system having a cold storage device coupled to the vehicle, the second cooling system being selectable to thermally charge the cold storage device when the engine is in an off position and being selectable to thermally charge the cold storage device and simultaneously cool the cabin when the engine of the vehicle is an on position, the second cooling system being thermally independent of the first cooling system.

10. The vehicle interior cooling system of claim 9, wherein the second cooling system is powered by an electrical source independent of the first cooling system.

11. The vehicle interior cooling system of claim 9, wherein the second cooling system is a water conditioning cooling system.

12. The vehicle interior cooling system of claim 9, wherein the first cooling system includes an engine driven first compressor for compressing a first refrigerant for cooling the cabin and wherein the electrically powered cooling system includes an electrically powered second compressor for compressing a second refrigerant for thermally charging the cold storage device.

13. A vehicle interior cooling system for a vehicle having a cabin and an engine for providing propulsion power, the vehicle interior cooling system comprising:
(a) a first cooling system disposed within the vehicle and driven by the engine; and
(b) a second cooling system having a cold storage device coupled to the vehicle, the second cooling system being selectable to thermally charge the cold storage device when the engine is in an off position and being selectable to thermally charge the cold storage device and simultaneously cool the cabin when the engine of the vehicle is in the off position, the second cooling system being thermally independent of the first cooling system.

14. The vehicle interior cooling system of claim 13, wherein the second cooling system is a water conditioning cooling system.

15. The vehicle interior cooling system of claim 13, wherein the first cooling system includes an engine driven first compressor for compressing a first refrigerant for cooling the cabin and wherein the electrically powered cooling system includes an electrically powered second compressor for compressing a second refrigerant for thermally charging the cold storage device.

16. A vehicle mounted cooling system for cooling an interior space of a vehicle, the vehicle having an engine for providing propulsion power to the vehicle, the vehicle mounted cooling system comprising:
(a) a cabin cooling system powered by the engine for cooling the interior space of the vehicle; and
(b) a cold storage system operable independently of the cabin cooling system, the cold storage system having a cold storage device thermally chargeable and dischargeable by the cold storage system for cooling the interior space of the vehicle, the cold storage system simultaneously thermally charging the cold storage device and supplementing the cabin cooling system in cooling the interior space of the vehicle while the engine is in the on position.

17. The vehicle mounted cooling system of claim 16, wherein the cold storage system thermally discharges the cold storage device when the engine is in an off position.

18. The vehicle mounted cooling system of claim 16, wherein the cold storage system thermally charges the cold storage device when the engine is an on position.

19. The vehicle mounted cooling system of claim 16, wherein the cold storage system is thermally independent of the cabin cooling system during a thermal charge cycle.

20. The vehicle mounted cooling system of claim 16, wherein the cold storage system selectively thermally charges the cold storage device when the engine is in an off position.

21. The vehicle mounted cooling system of claim 16, wherein the cabin cooling system includes a first compressor driven by the engine for compressing a first refrigerant for cooling the interior space of the vehicle.

22. The vehicle mounted cooling system of claim 21, wherein the cold storage system is electrically driven and includes an electrically powered second compressor for compressing a second refrigerant for thermally charging the cold storage device.

* * * * *

UNITED STATES PATENT AND TRADEMARK OFFICE
CERTIFICATE OF CORRECTION

PATENT NO. : 7,043,931 B2  
APPLICATION NO. : 10/900237  
DATED : May 16, 2006  
INVENTOR(S) : L.E. Plummer It is certified that error appears in the above-identified patent and that said Letters Patent is hereby corrected as shown below:

| COLUMN | LINE | ERROR |
|---|---|---|
| (75) Pg. 1, col. 1 | Inventor | "Lew E Plummer," should read --Lew E. Plummer,-- |
| (56) Pg. 2, col. 1 | Refs. Cited (Other Publs., Item 7) | "Développment" should read --Développement-- |
| (56) Pg. 2, col. 2 | Refs. Cited (Other Publs., Items 9-14) | delete as duplicative "Atkinson, W., ...." "Demonstration Progress...." "Development of an Advanced.... "Our Products:... Novacab,... "Projet REHP$^2$:..." |

Signed and Sealed this

Twelfth Day of December, 2006

JON W. DUDAS  
*Director of the United States Patent and Trademark Office*